Dec. 14, 1937.  G. W. CRABTREE  2,102,061
SPRING COVER
Filed Feb. 18, 1935  2 Sheets-Sheet 2
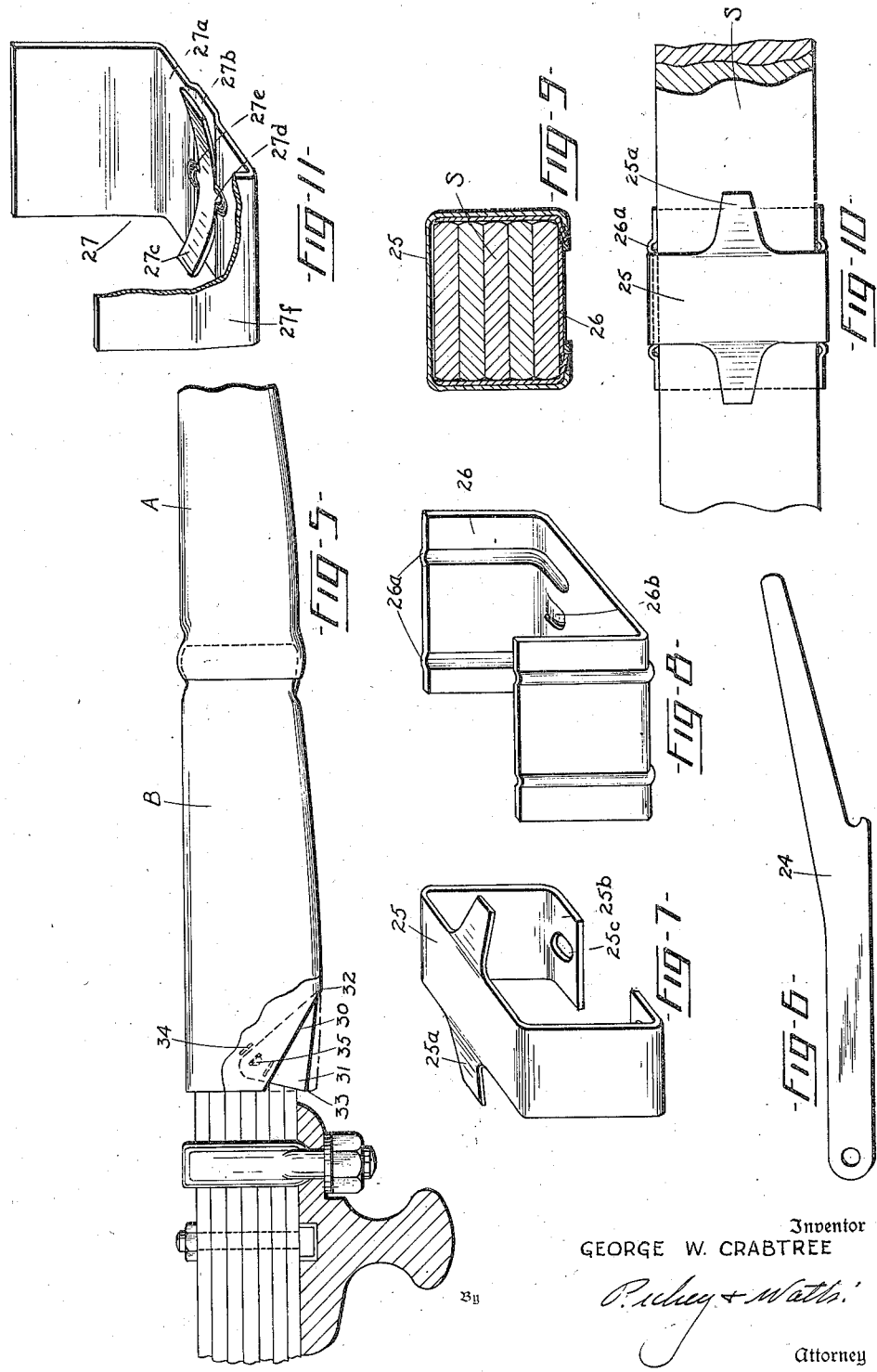
Inventor
GEORGE W. CRABTREE Patented Dec. 14, 1937

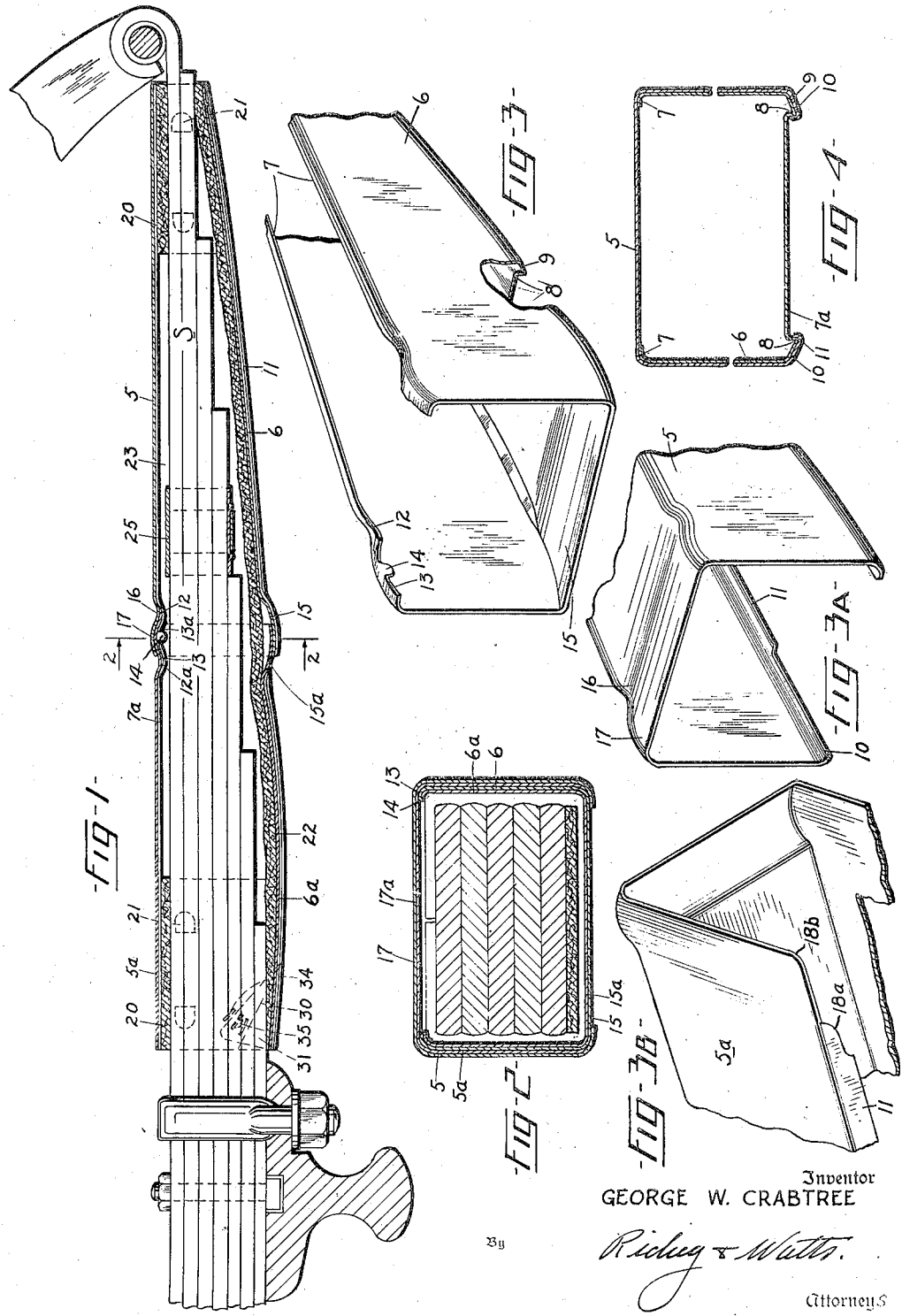

2,102,061

UNITED STATES PATENT OFFICE 2,102,061

SPRING COVER

George W. Crabtree, Cleveland Heights, Ohio

Application February 18, 1935, Serial No. 6,966

8 Claims. (Cl. 267—37)

This invention relates broadly to vehicle spring covers and is particularly concerned with spring covers of the metallic interfitting box-section type such as that disclosed in my prior Patent No. 1,981,448 granted November 20, 1934, the primary object being to generally improve the construction and operating characteristics of spring covers of this type.

The features of improvement are particularly directed toward relatively long cover sections having a flexible joint at the point where they overlap or interfit with one another, the joint being so constructed that the sections are permitted full freedom of flexure with the action of the spring without restricting the latter and without the imposition of any strain or localized stress upon the cover sections, while at the same time the joint remains tightly sealed and holds the sections in assembled relation under all conditions. The sections are preferably die struck or stamped from sheet metal and the improved joint is so constructed that it may be simultaneously formed during such stamping operation. Another advantage of the present improved joint is that it permits ready assemblage of the cover sections on a spring irrespective of the camber of the spring.

Other features include an improved snap-on lock construction for the edge portions of the channels constituting the cover sections, and a seal or felt-retaining means at opposite extremities of the cover which may be readily stamped from the sheet metal sections.

The invention further contemplates an improved clip member for leaf springs which is particularly adapted for use with spring covers and particularly covers of the box-section type, said clip being capable of economical manufacture and easily applied in position on a spring.

The foregoing and other objects and advantages will become apparent in view of the following description taken in conjunction with the drawings, wherein:

Figure 1 is a longitudinal sectional view of a spring cover embodying the features of the present invention in assembled position on a vehicle spring;

Figure 2 is a transverse vertical section taken on the line 2—2 of Figure 1;

Figure 3 is a view in perspective, partially broken away, of one of the bottom channel members;

Figures 3a and 3b are fragmental perspective views of the adjacent telescoping end portions of the top channel members;

Figure 4 is a transverse vertical section taken through the cover, showing the top and bottom channel members in assembled position but with the spring omitted;

Figure 5 is a view in side elevation of the cover of Figure 1, the one extremity being partly broken away;

Figure 6 is a detail view of a tool adapted for use in removing the improved cover assembly;

Figures 7 and 8 are detail views in perspective of top and bottom clip members which are preferably used with the cover assembly in place of the conventional clip;

Figure 9 is a transverse vertical section through a spring and clip applied thereto; and Figure 10 is a top plan view of a portion of a spring having one of the clips thereon.

Figure 11 is a broken perspective view of a modified form of clip.

Referring to Figures 1 to 5, inclusive, the cover comprises a plurality of sections which are preferably formed of sheet metal, the sections in assembled relation being indicated at A and B in Figure 5, and the spring being indicated as S throughout the several figures. Each section comprises a top and bottom half, the respective halves or channel members of the section A being indicated at 5 and 6, and those of B indicated at 5a and 6a. While only two sections are shown in the drawings, it will be understood that this number may be increased in accordance with the length of spring to be covered. It is preferred, however, that the sections be relatively long so that in most cases two or at the most three sections will be sufficient to completely encase the spring. The respective halves of each section are preferably channular or of substantially U-shape cross section with the side walls of the top and bottom channels overlapping or overlying one another to provide a rigid and strong wall construction and at the same time to afford sufficient bearing to support the channels.

The respective halves of each section are substantially similar in construction with the exception of certain details of the telescoping joint, the construction whereof will subsequently be described. The bottom channel member 6, as illustrated in Figure 3, comprises a sheet metal stamping having the upper portion of the side walls bent inwardly to form strengthening and gripping flanges 7. The bottom wall of the channel 6 is formed with snap-on beads 8 adjacent the corners thereof, the said bead merging into a sloped or tapered edge portion 9. The coacting bottom channel member 6a is substantially similar in construction to the channel member 6 with the exception of certain changes in the telescoping joint which are apparent from the sectional view in Figure 1, hence a detail view of this channel member is omitted.

The top channel 5 is formed as shown in Figures 3a and 4 with the free ends of the side walls pressed inwardly to define a sloping snap-on flange 10 terminating in an upturned retaining lip 11, the flange 10 and lip 11 being adapted for assembled engagement with the coacting wall 9 and bead 8 of the channel 6. Each top channel is proportioned relative to the bottom companion member therefor to snugly engage the upturned flanges 10 under sufficient tension to cause the bead 11 to snap into engagement with the bead 8 when the members are assembled. By this means the sections may be easily and quickly mounted upon a spring. With the exception of the telescoping joint, the top channels 5 and 5a are also substantially similar in construction.

Since the sections A and B are relatively long to more efficiently serve their functions and also to permit economy of manufacture and simplicity of assembly, it is of advantage that a joint be provided at the points of engagement of one section with another which will permit free rocking movement between the cover sections without restricting the flexure of the cover or spring. To this end the invention contemplates a cover structure including a jointed connection which will facilitate the free flexing action of the cover and spring and at the same time provide an efficient seal against the entrance of foreign matter as well as the escape of a lubricant within the cover.

Referring particularly to Figures 1 and 3, the joint of the bottom channel 6 is formed by depressing the top flanges 7 into an arcuate portion 12 which defines the inner extremity of the joint, and beyond this portion 12 adjacent the end of the cover section forming the flanges with an upwardly bowed or reversely curved portion as illustrated at 13. These portions 12 and 13 provide a bearing surface which is analogous to the pin in a hinge, the complemental joint of the top section forming the spring plate which rolls or rocks thereover. Lugs 14 are preferably formed intermediate the ends of the arcuated flanges 13, said lugs being bent downwardly over the complemental joint portions 12a and 13a formed in the flanges 7a of the adjacent channel section 6a, note particularly Figure 1.

The end portion of the bottom wall of the channel 6 is likewise arcuately formed to define the lower bearing surface 15 of the roller or hinged joint, the snap-on beads 8 and contiguous tapered walls 9 of the cover terminating preferably adjacent the point at which the bottom walls merge with the arcuate bearing surface 15. The joint bearing surface 15 engages a complemental surface 15a formed in the adjacent section 6a. The arcuate bearing surfaces in the upper sections are preferably formed with radii of constant length and from the same center so that in the manufacture of the parts the upper sections may be struck or pressed from the same die. The lower sections, however, are formed with arcuate bearing surfaces developed from the same center as that of the upper sections but varying in radial length with the depth of the sections. Thus, where the cover sections are of different depth to accommodate springs of variable thicknesses, the radius for the surface 15 may be varied to accommodate such change but in no case is it necessary to change the radius for the bearing surface 13 in the upper sections.

The top channels 5 and 5a are each formed with reversely curved joint portions 16 and 17 which are adapted to fit over the bearing surfaces 12 and 13 formed in the telescoping ends of the flanges 7 of the bottom channel 6. The snap-on 11 formed in the tapered flanges 10 of the top channels 5 and 5a terminate at a point adjacent the arcuate bearing surfaces 15 and 15a of the bottom channels 6 and 6a to permit free pivotal movement at this point—note particularly Figures 3a and 3b.

In the channel 5a the lips 11 are cut away as at 18a leaving a flange-free side wall 18—note particularly Figure 3b—having a rounded corner 18b to permit a free action at this joint.

From the foregoing, it will be seen that the structure affords what is in effect a hinged joint in the telescoping extremities of the channels which constitute the sections A and B, the joint being readily formed from sheet metal and so constructed as to facilitate the ready assembly of the cover. This type of joint provides a snug bearing which is completely sealed throughout the flexing action of the spring and is also interlocked to insure against longitudinal separation of the respective members of the cover and locate the constituent parts of the assembly upon the spring. This type of joint also permits the cover to be easily installed on a spring regardless of whether the latter is planolinear or formed with an appreciable camber. It will also be noted that there is no tendency of the sections to pry themselves open or become separated due to the vibratory action or flexure of the spring while in service upon the road.

The cover is preferably provided with sealing pads 20 at each extremity of the cover sections, and in order to insure against displacement of these pads, locking lugs 21 are provided in the side walls of the bottom sections. The pads 20 are preferably of felt or light absorbent material, and are clamped by the lugs or ears 21 when the pads are assembled in the channel. The ears 21 may be pierced and formed from the sheet metal side walls of the channel, and the felt pad 20 may be apertured for entry thereover, and the ears then bent or clamped down upon the pad coincident with the assembly of the cover upon the spring.

The conventional fabric wrappings around the body of the spring are not required with the present long section type of cover and in fact are undesirable, since they tend to hinder the distribution of lubricant around the spring. In the present invention therefore such wrappings have been eliminated. A lubricating pad 22 along the bottom of the spring has been adopted It will be noted that the cover is in spaced relation with the spring at the top thereof which provides a chamber 23 to retain a lubricant. When the cover is assembled upon the spring this chamber may be supplied with a lubricant so that the flexing action of the spring will displace the lubricant and cause in effect a pumping action which will force the lubricant between the contiguous leaves of the spring.

As illustrated in Figures 1 and 5, the side walls of the inner end of the lower section 6a may be cut obliquely upon the line 30 to form tabs 31 which may be folded within the contiguous side walls and then forced upwardly, the bottom wall bending at 32 and the edge of the free end 33 abutting the spring. The side walls as shown are formed with slots 34 which receive a tongue 35 struck from the walls of the tab and which is suitably positioned to engage one of the slots and sustain the tab in its folded relation.

The manner of assembling the improved cover comprises: mounting the end pads 20 in the opposite extremities of the bottom channel 6 and 6a, then positioning these sections about the spring, next placing the top sections over the side walls of the bottom section with the arcuate bearing surfaces longitudinally adjusted in interengaged relation, then forcing the top section downwardly until the lips 11 snap into locked securement with the bead 8. It will be noted from the above that the manner of assembly is so simple that it does not entail the services of skilled labor or the use of special tools. However, to facilitate separation of the sections, a tool 24, note Figure 6, is provided which may be employed to grip the lip 11 and free the latter from the head 8 at the bottom channel 6.

In Figures 7 to 10, inclusive, there is shown a type of spring clip which is particularly adapted for use in conjunction with covers of the type heretofore described. This clip comprises interlocking top and bottom members 25 and 26. The top clip member 25 is formed with downwardly bent tension ears 25a and lower unturned locking flanges 25b formed with openings 25c. The bottom clip 26 is constructed with reinforcing beads 26a on the outer face thereof which are suitably spaced to effect the retention of the upper member 25 therebetween. The lower face of the member 26 is formed with locking lugs or ears 26b preferably formed from the body of the member. In assembling the clip upon a spring the lower member 26 may be positioned about the spring with the free ends thereof disposed upwardly. The top portion 25 may then be sprung open, positioned upon the member 26 and pressed downwardly between the beads 26a and then clamped upon the lower member 26, the ears 26b engaging the openings 25c to effect the locked securement of the two members. In assembled relation the ears 25a are suitably bent to serve as tension members between the clip and the spring and these insure a tight anti-rattle connection. This type of clip is preferably used in place of the conventional draw bolt clip, since there are no protrusions thereon to interfere with the cover sections A and B when assembled on a spring.

The clip shown in Figure 11 is of a simplified type yet is highly effective in performing its function. The body of the clip is generally indicated at 27 and as shown is ready to be applied to a spring. The transverse wall 27a, which may be considered the base of the clip, has a channel 27b pressed therein, and a tensioning spring 27c is disposed in said channel and serves to ensure against loosening and rattling of the clip during service. The preferred method of securing this spring in place is to form the same with lugs or ears 27d and impress mating recesses into the metal of the side walls of the channel, the lugs or ears 27d being engaged in said recesses and the metal then peened thereover as indicated at 27e. The side walls of the clip are preferably given an obtuse angle shape with respect to the base or are initially set outwardly as at 27f to a point about in line with the top of the series of spring leaves to which the clip is to be applied, to facilitate insertion of the clip over the said leaves. The clip may be applied by a suitable tool, not shown, and when the free edge portion of the side walls are bent over the spring, the tool simultaneously bends the walls at 27f against the sides of the spring. Ease and rapidity of installation are further important features of this clip.

It will be understood that certain changes and variations in structure may be adopted in my improved spring cover and coacting parts without departing from the scope of the invention as defined by the appended claims.

I claim:

1. A cover for leaf springs comprising a plurality of box-like sections each of which embodies top and bottom substantially U-shaped channels having end portions which telescope with the end portions of the channels of an adjacent section, each telescoping portion being formed with interfitting rounded joints to permit flexing of the sections while maintaining a seal at the joint.

2. A sheet metal cover for leaf springs comprising a plurality of box-like sections each of which embodies top and bottom substantially U-shaped channels having end portions which telescope with the end portions of the channels of the adjacent section, each telescoping portion being pressed into complementary reversely-curved bearing surfaces to provide a hinge joint between the sections.

3. A sheet metal cover for leaf springs having a plurality of box-like sections which telescope into one another at their adjacent extremities each of which comprises a channel member formed with an arcuate joint portion in the bottom wall thereof and top flanges also formed with arcuately-formed joint portions, and a coacting channel member adapted to fit over the first-named channel member and formed with a complemental arcuately-formed joint portion in the top wall thereof which coacts with the joint formed in said flanges.

4. A cover for leaf springs comprising a plurality of relatively long box-like sections each of which comprises top and bottom substantially U-shaped channels having end portions which telescope with the end portions of the channels of an adjacent section, said end portions being formed with complementary arcuate bearing surfaces to define telescoping hinge joints therebetween, the radius of the joint portion of one channel remaining constant in all like channels while the radius of the complemental joint portion of the telescoping channel is longer than the radius of the first-named joint portion when taken from a common transverse center to facilitate variation of the joint in accordance with different cross-sectional sizes of sections.

5. A sheet metal cover for leaf springs comprising a plurality of box-like sections adapted to telescope into one another at their adjacent extremities, one of said sections comprising a bottom channel member having an arcuate joint portion formed in one extremity of its bottom wall and top flanges also having arcuate joint portions formed therein, said flanges being provided with means for slidably locking them to the flanged joints of the channel member of a complemental section to assist in holding the channel members against separation.

6. A sheet metal cover for leaf springs having a plurality of box-like sections which telescope into one another at their adjacent extremities, one of said sections comprising a bottom channel member having an arcuate joint portion pressed into one extremity of its bottom wall and top flanges also having joint portions formed therein, said flanges being formed with projecting lugs adapted to be bent over and engage the flanged joints of the channel member of a complemental section to assist in holding the channel members against separation.

7. A cover for leaf springs having a plurality of relatively long box-like sections each of which comprises top and bottom substantially U-shaped channel members having end portions which telescope into the end portions of the channel members of an adjacent section, each telescoping end portion being formed with interfitting rounded joints to permit flexing of the sections, the bottom channel member being formed with snap-on beads which extend longitudinally along the bottom wall thereof and terminate in said joint portion and the top channel member being formed with side walls which snugly fit over the side walls of the bottom channel member and terminate in hooked flanges adapted to engage said snap-on beads.

8. A cover for leaf springs comprising a plurality of box like sections, each of which embodies body and cap members in the form of U-shaped channels having end portions which telescope with the end portions of the body and cap members of an adjacent section, each telescoping end portion being formed with interfitting rounded joints to permit flexing of the sections while maintaining a seal at the joint, and means carried by one body member to secure said body members to each other in said telescoped end portions.

GEORGE W. CRABTREE.